July 2, 1963 D. B. JAMES ETAL 3,096,403

SCANNING CONTROL CIRCUIT

Filed July 21, 1960 6 Sheets-Sheet 1

INVENTORS D.B. JAMES
W.A. MALTHANER
J.P. RUNYON

BY John C Albrecht

ATTORNEY

INVENTORS D.B. JAMES
W.A. MALTHANER
J.P. RUNYON
BY John C Albrecht
ATTORNEY

SCANNING CONTROL CIRCUIT

Filed July 21, 1960 6 Sheets-Sheet 3

INVENTORS D.B. JAMES
W.A. MALTHANER
J.P. RUNYON
BY John C Albrecht
ATTORNEY

SCANNING CONTROL CIRCUIT

Filed July 21, 1960 6 Sheets-Sheet 4

INVENTORS D.B. JAMES
W.A. MALTHANER
J.P. RUNYON
BY John C Albrecht
ATTORNEY

July 2, 1963 D. B. JAMES ET AL 3,096,403

SCANNING CONTROL CIRCUIT

Filed July 21, 1960 6 Sheets-Sheet 5

INVENTORS D.B. JAMES
W.A. MALTHANER
J.P. RUNYON
BY John C Albrecht
ATTORNEY

SCANNING CONTROL CIRCUIT

Filed July 21, 1960 6 Sheets-Sheet 6

INVENTORS D. B. JAMES
W. A. MALTHANER
J. P. RUNYON

BY John C Albrecht

ATTORNEY 3,096,403

SCANNING CONTROL CIRCUIT

Dennis B. James, Far Hills, William A. Malthaner, New Providence, and John P. Runyon, Mendham, N.J., assignors to Bell Telephone Laboratories, Incorporated, New York, N.Y., a corporation of New York Filed July 21, 1960, Ser. No. 44,431
18 Claims. (Cl. 179—18)

This invention relates in general to telephone switching systems and more particularly to the scanning of subscriber stations in a time division multiplex switching system.

In the copending application of D. B. James, J. D. Johannesen, M. Karnaugh, and W. A. Malthaner, Serial No. 760, 502, filed September 11, 1958, which is now Patent No. 2,957,949, issued Oct. 25, 1960, there is shown a time division multiplex pulse code modulation telephone switching system employing remote concentrators. In the above-noted system, the concentrators each include control means, a time division transmission network, transmitting sampling and encoding means, and receiving decoding and gating means, all of which are time shared by the subscribers served by the concentrator. Two hundred and fifty-five subscribers are served by each concentrator and a repetitive office cycle comprising 24 time slots of 8 information bits each is employed.

The central office comprises a concentrator controller which is discrete to a concentrator, an office control module which is common to all of the concentrators, and a time and space division transmission switching network, portions of which are discrete to a concentrator and other portions which are common to the plurality of concentrators.

In the system of the above-noted copending application, the scanning of subscribers' lines to detect requests for service and hangups is accomplished in the 24th time slot of the repetitive office cycle and the transfer of call signaling information, i.e., dialing information, is by way of voice communication between a calling subscriber and an operator.

Advantageously, in accordance with this invention, subscriber stations are scanned to detect requests for service during a first idle time slot of the repetitive office cycle rather than in a fixed time slot and are scanned to detect answers, hangup, and dial pulses during the time slot assigned to the call. This arrangement is particularly advantageous from the standpoint of simplicity of control as each time a subscriber's line is connected in the repetitive office cycle, the line is scanned and its supervisory state noted. The scanner response is returned to the central office concentrator controller just preceding the time at which communication information signals are normally passed through the central office switching network. Call progress words which reflect the current state of the calls served in each time slot are maintained in a circulating memory in the central office concentrator controller. The call progress words are available from the memory at the time at which scanner responses are received from the remote concentrator. A call progress word translator processes the current call progress word and the indication of the supervisory state of the line served in the particular time slot to up-date the circulating memories in the central office concentrator controllers and the indication of the supervisory state is used to generate dial pulses for transmission through the switching network.

It is an object of this invention to make more efficient use of the information capacity of a time division multiplex telephone switching system.

It is another object of this invention to permit the use of conventional dial call signaling information in a time division multiplex telephone swtching system.

It is another object of this invention to scan subscribers' stations without the introduction of objectionable noise signals to the subscriber whose station is scanned.

In accordance with one feature of this invention, all time slots of a repetitive office cycle are employed for purposes of information communication and subscriber lines are generally scanned to detect requests for service only when an idle time slot is present.

In accordance with another feature of this invention, subscriber lines are scanned to detect answers, hangups, and call signaling information, i.e., dial pulses, during the time slot which is assigned to a call for puposes of information communication.

In accordance with another feature of this invention, dial signaling information is transmitted from a remote concentrator as a single bit and is arranged to arrive at the central office concentrator controller just preceding the time at which communication information signals are expected from the subscribers served in the particular time slot.

In accordance with another feature of this invention, dial signaling information is transmitted through the central office time and space division switching network to an assigned register over a regular information communication channel.

In accordance with another feature of this invention, a first scanning routine is employed at the central office to detect requests for service and a second scanning routine is employed to detect answers, hangups, and dial pulse signals.

In accordance with another feature of this invention, the scanning routine to detect requests for service and the scanning routine to detect hangups, answers, and dial pulse signals are interleaved within a frame of the office operating cycle.

In accordance with still another feature of this invention, a single scanning routine is employed at the remote concentrator and is independent of the purpose for which the line is scanned.

In accordance with another feature of this invention, lines which are served by the concentrator for the purpose of communication are omitted from the scanning routine to detect requests for service for the duration of the call.

The above and other objects and features of this invention can best be understood with reference to the drawing in which:

FIG. 1 is a block diagram of a time division multiplex pulse code modulation telephone switching system in accordance with the copending application of D. B. James, J. D. Johannesen, M. Karnaugh, and W. A. Malthaner, Serial No. 760,502, filed September 11, 1958, which is now Patent No. 2,957,949;

Certain of the drawings, namely, FIGS. 1, 2, 3, 8, and 18 of the above-noted copending application are included in this application either in whole or in part and, where shown in part, the figures have been modified to show the features of this invention.

Figure 1:
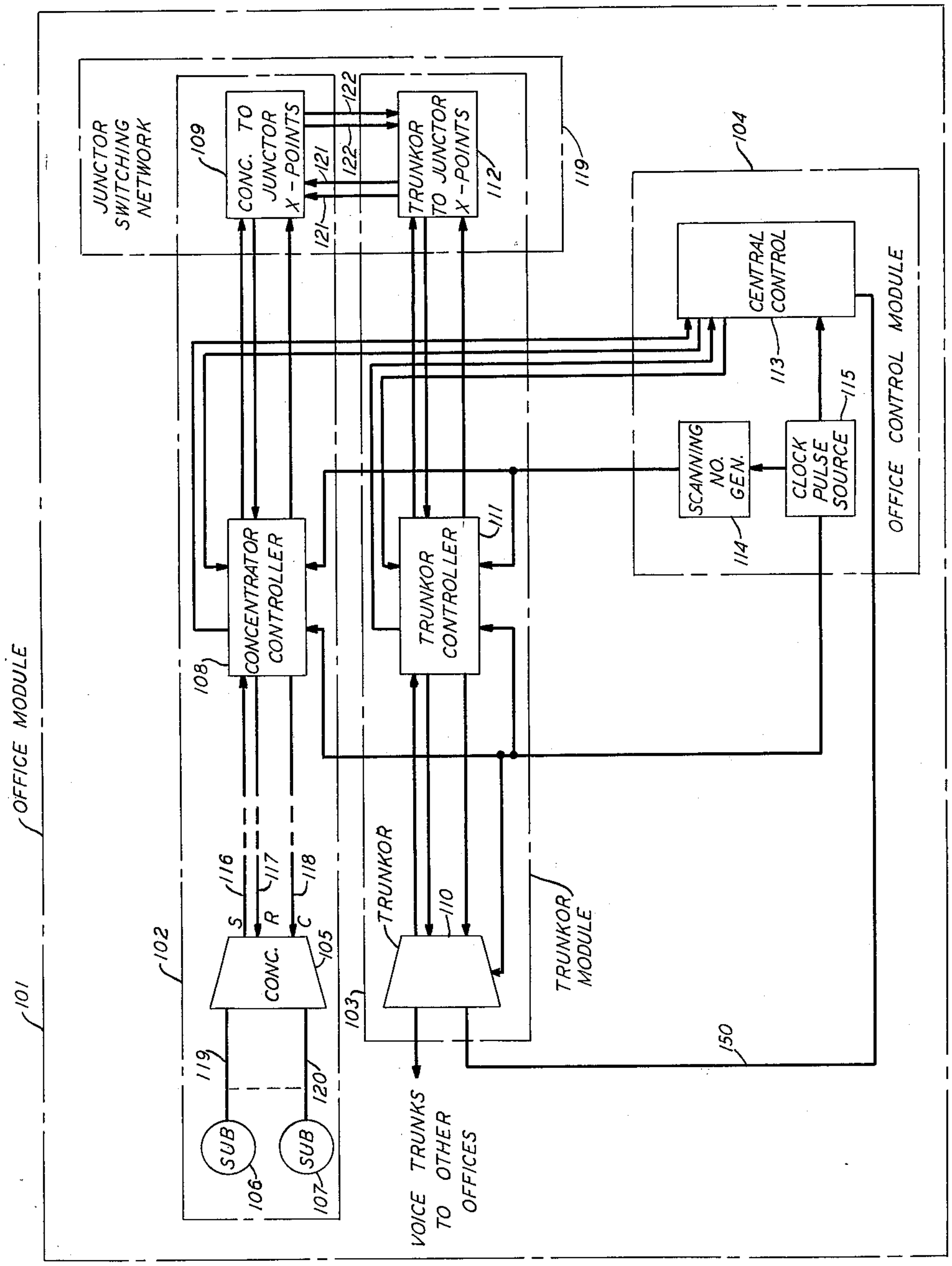
Figure 2:
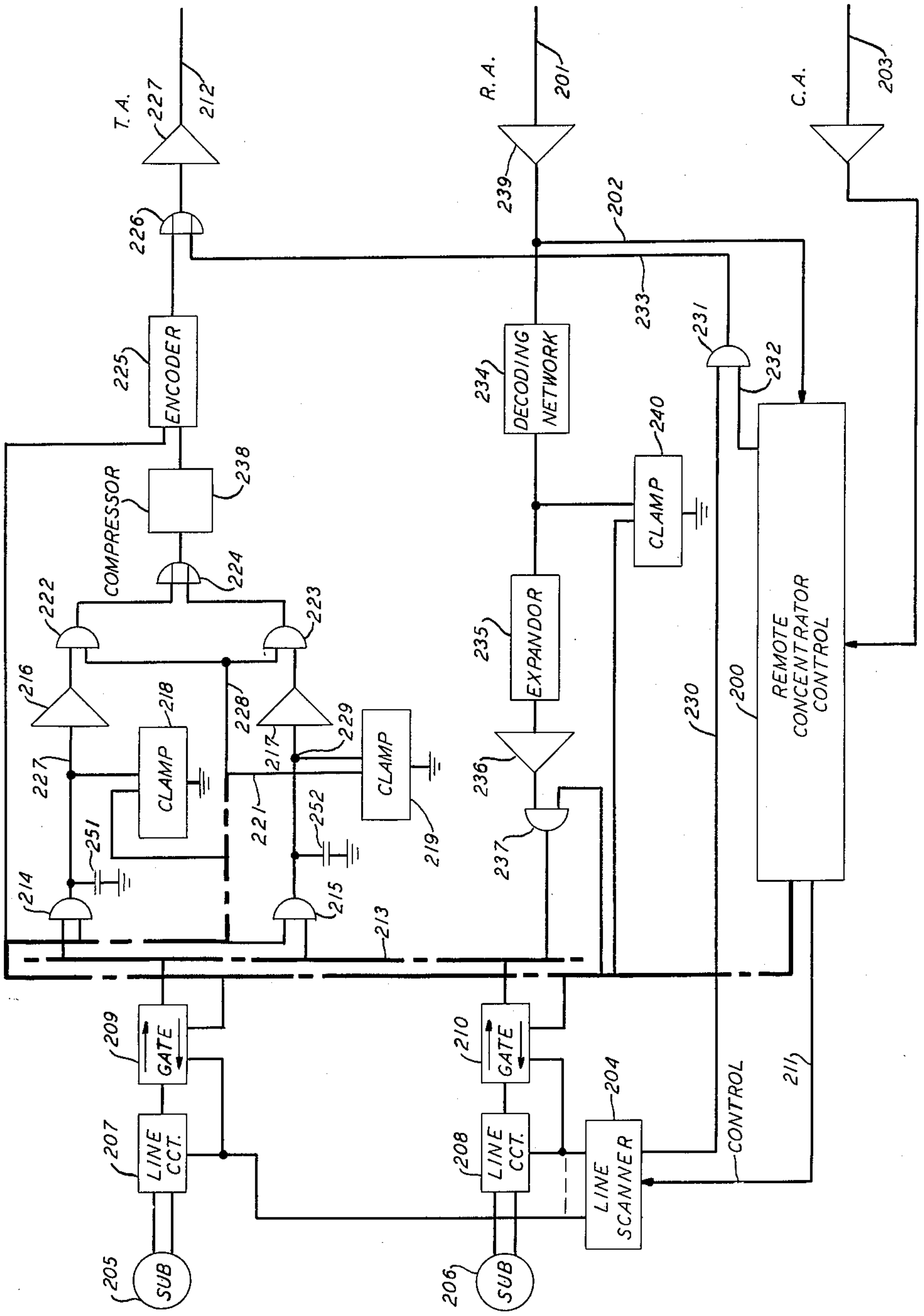
FIG. 2 is a block diagram schematic of a remote concentrator of the system of FIG. 1.
Figure 3:
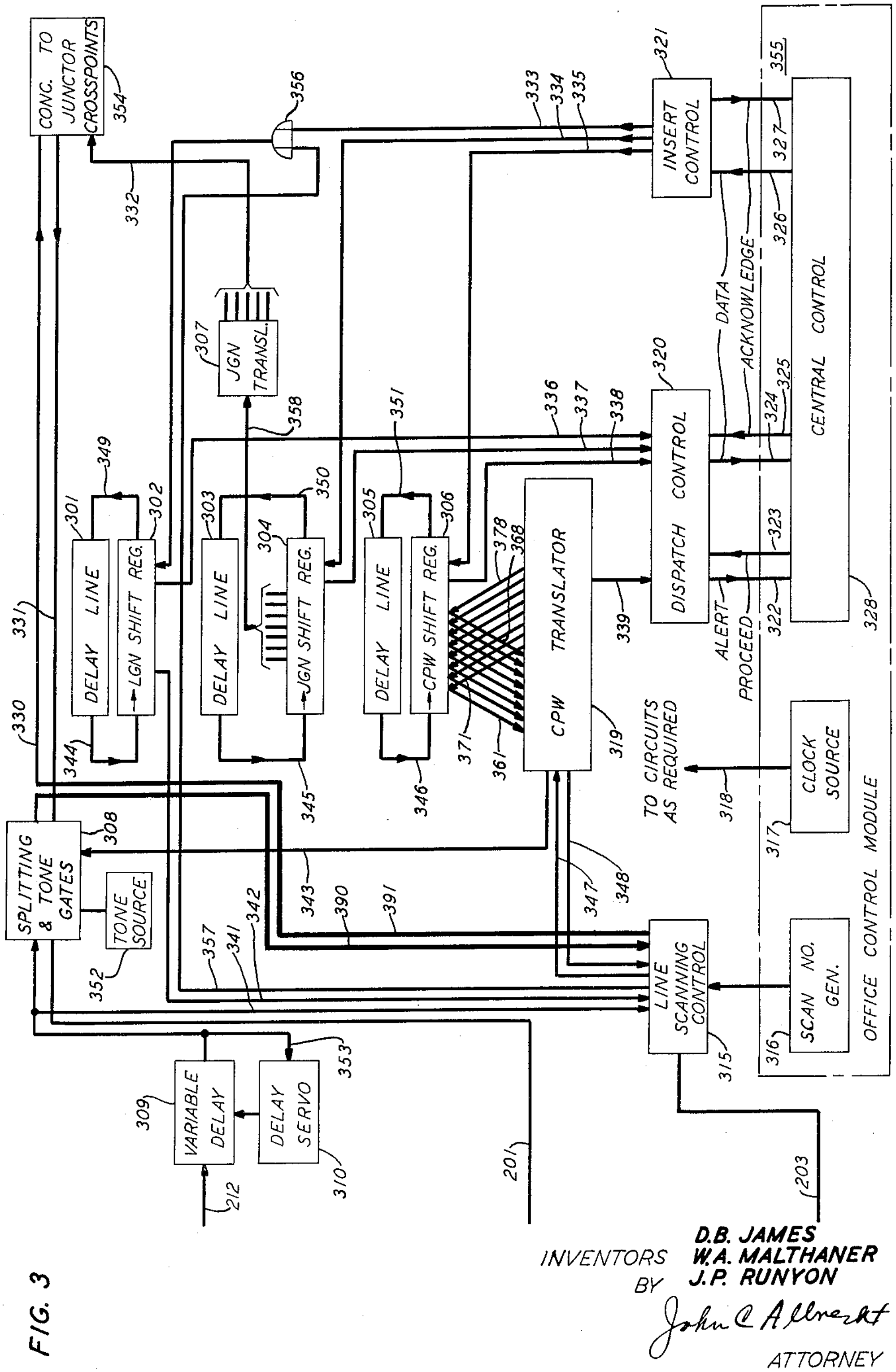
FIG. 3 is a block diagram of a concentrator controller and office control module in accordance with the system of FIG. 1 is modified in accordance with this invention.

FIGS. 1 and 2 are repeated without substantial modification and FIG. 3, as indicated by the heavy lines between the Line Scanning Control 315 and Conductor 330, is modified only slightly to show the new function of the Line Scanning Control 315.

Figure 4:
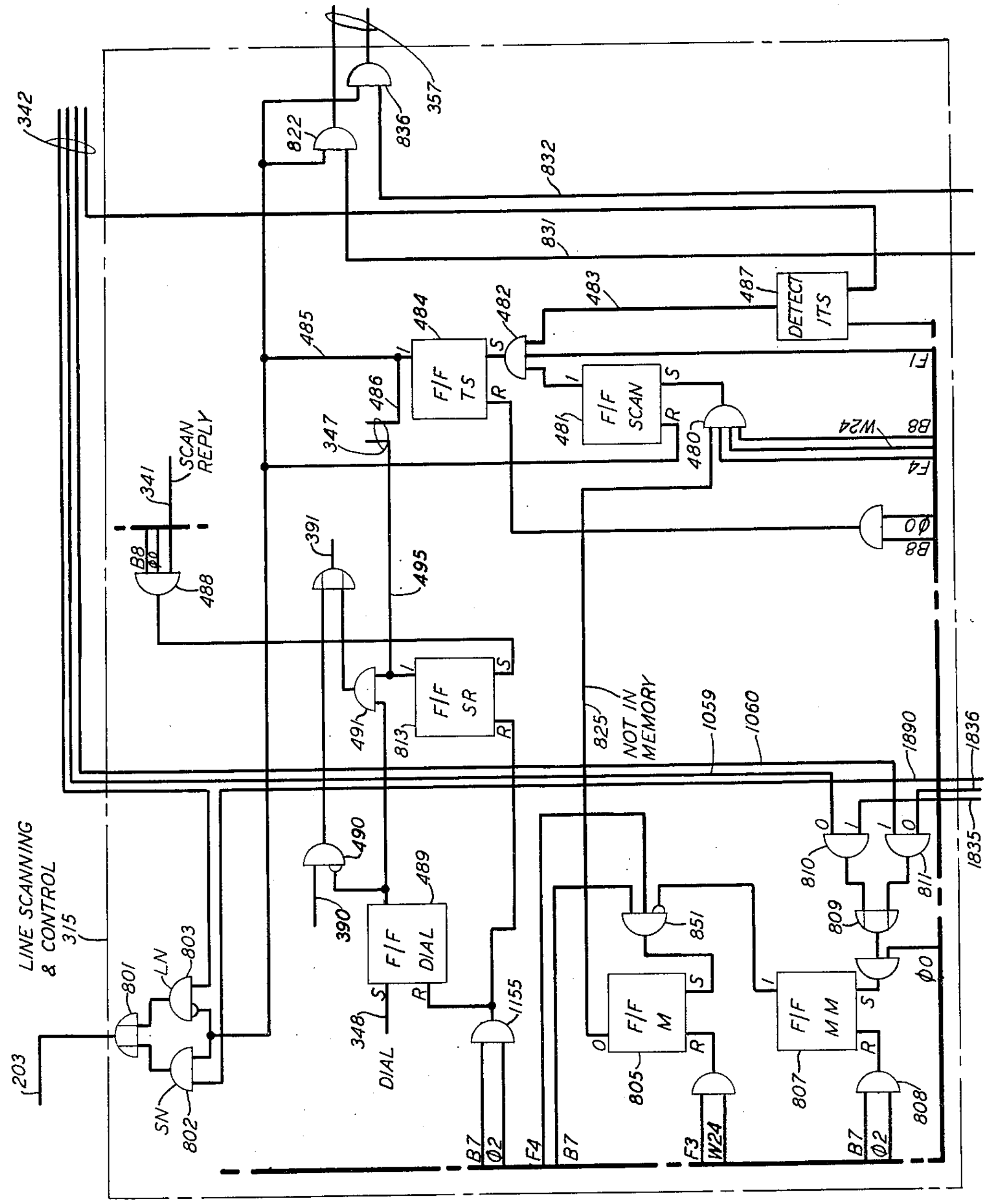
FIG. 4 is a block diagram schematic of the line scanning control of FIGS. 2 and 3 as modified by this invention.

FIG. 8 of the copending application is quite thoroughly changed and appears as FIG. 4 in this application.

Figure 5:
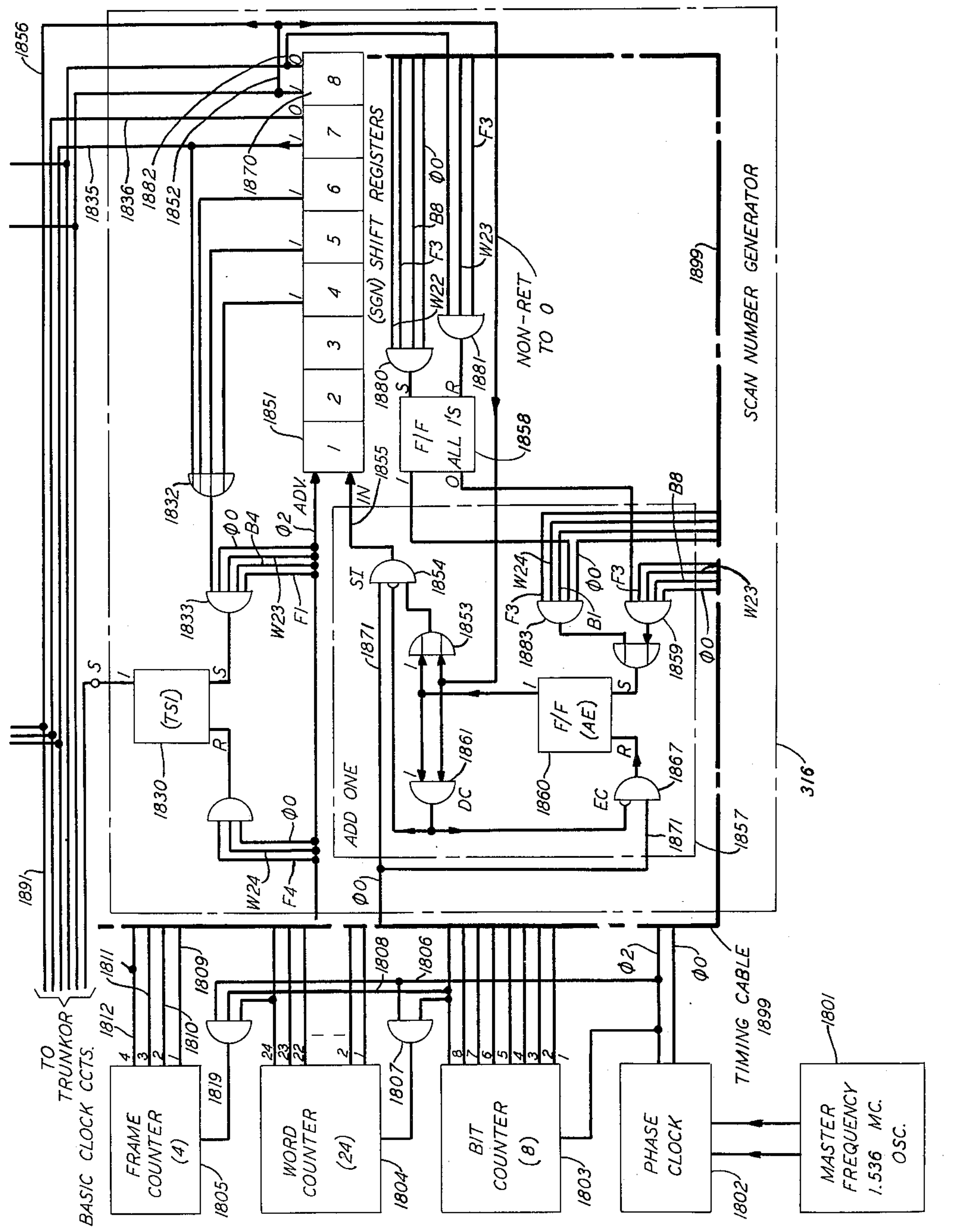
FIG. 5 is a block diagram of the clock pulse source and scanning number generator of the system of FIGS. 1 and 3 as modified by this invention.

FIG. 18 of the copending application is substantially unchanged and appears as FIG. 5 herein.

The present invention can best be understood with an understanding of the operation of the system of the above-noted copending application of James et al.

In FIG. 1 there is shown an Office Module 101 which comprises a Concentrator Module 102, a Trunkor Module 103, an Office Control Module 104, and a Junctor Switching Network 119. Although only one Concentrator Module 102 is shown, it is to be understood that each office module comprises a plurality of concentrator modules and possibly a plurality of trunkor modules.

For purposes of control and communication transmission, a basic office order of time or repetitive office cycle is established. A Master Frequency Oscillator 1801, shown in FIG. 5, provides a basic clock frequency of approximately 1.536 mc.; the Phase Clock 1802, which is responsive to output signals from the Master Frequency Oscillator 1801, provides two phases of clock signals, namely, phase 0 and phase 2; the Bit Counter 1803, which is responsive to phase 2 clock signals from the Phase Clock 1802, provides eight bit signals, namely, bits 1–8, the Word Counter 1804, which is responsive to bit 8 signals from the Bit Counter 1803, provides twenty-four word signals, namely, words 1–24, and the Frame Counter 1805, which is responsive to word 24 signals from the Word Counter 1804, generates four frame signals, namely, frames 1–4, each comprising twenty-four words to define a scanning cycle.

Communication through the Concentrator 105 and through the Switching Network 119 is on a time division basis in accordance with the above-noted repetitive office cycle. The Concentrator 105 is capable of serving twenty-four communication connections in an office cycle. In that a plurality of concentrator modules are provided in each office module, the Junctor Switching Network 119 is both a time and space division network. That is, a number of junctors such as 121 and 122 are employed to provide communications between pairs of concentrators or between a concentrator and a trunkor during any given time slot of the repetitive office cycle. Three broadband communication paths, namely, 116, 117, and 118 interconnect the Concentrator 105 and its associated Concentrator Controller 108. Each of these comunication paths is a unidirectional path. The Send Transmission Path 116 is employed to transmit information communication signals originating at subscribers such as 106 and 107 and supervisory signals originating in the Concentrator 105 from the Concentrator 105 to the Concentrator Controller 108 and to the Concentrator-To-Junctor Crosspoints 109.

To receive communication path such as 117 is employed to transmit communication information signals originating with a subscriber served by the same or other concentrator or from a remote trunk or operator to the Concentrator 105 for transfer to the subscriber stations such as 106 and 107.

The Communication Path 118 is employed to convey signals for controlling the Concentrator 105 from the Concentrator Controller 108.

In accordance with this invention, subscriber stations are scanned in an orderly manner to detect requests for service. That is, all subscriber lines which are not currently served for purposes of communication are consecutively scanned under control of the Line Scanning Control Circuit 315 to detect requests for service. Lines which are served for purposes of communication are scanned in the time slot in which they are served. Lines are scanned to detect requests for service in accordance with the setting of the Line Scanning Gate Number Generator 316 of FIG. 5.

The Scan Gate Number Generator 316 is common to all concentrators and trunkors served by a single central office module. The Scan Gate Number Generator 316 serves to sequentially provide the binary codes representative of line numbers 1 through 255, inclusive. A scanning cycle comprises four frames of twenty-four time slots each. The scanned line is addressed during the first idle time slot of the first frame, the scan response is returned to the concentrator controller during the same time slot of the second or third frame, and action is taken upon the scan response immediately after receipt thereof. The Scan Gate Number is incremented once every four frames. The Scan Gate Number, once generated, circulates in the loop which includes the Scan Gate Number Shift Register 1851, the Output Conductor 1852, OR Gate 1853, AND Gate 1854, and Input Conductor 1855. The Serial Scan Gate Number is available to each of the concentrator and trunkor controllers via Conductor 1856. The line number 00 in which all elements of the code are zeros is systematically omitted in the repertoire of the Scan Gate Number Generator 316.

The Add 1 Circuit 1857 serves to increment the circulating Scan Gate Number once every four frames. If a code other than the code for the number 255 is circulating in the loop, the All 1's Flip-Flop 1858 will be reset to its "0" state sometime during the twenty-third word of the third frame and at phase 0, bit 8 of the twenty-third word of the third frame, AND Gate 1859 will be enabled to set the Add 1 Flip-Flop 1860. Setting of the Add 1 Flip-Flop 1860 causes the circulating Scan Gate Number to be incremented by one count. The Scan Gate Number circulates from stage 1 to 8 and back to stage 1 with the least significant bit being the first element of the serial code. As is well known, a binary number is incremented by one count by starting with the least significant bit and changing the value of the bits so long as a change is made from a "1" to a "0" and stopping as soon as the first shift is made from "0" to "1." So long as the eighth stage 1870 of the Scan Gate Number Shift Register remains in its "1" state, the Output Conductor 1852 will be enabled and this signal and the "1" output of the Add 1 Flip-Flop 1860 are combined to enable AND Gate 1861. Enablement of AND Gate 1861 inhibits AND Gate 1867 to prevent resetting of the Add 1 Flip-Flop 1860 and inhibits enablement of AND Gate 1854. Accordingly, each time a "1" is read from the serial shift register on Conductor 1852, a "0" is inserted in the first stage of the Shift Register 1854 to replace the "1."

Upon the occurrence of a "0" on Conductor 1852, AND Gate 1861 will be disabled and via OR Gate 1853 AND Gate 1854 will be enabled upon the occurrence of the immediately succeeding phase 0 pulse on Conductor 1871. Accordingly, a change in the code is made from a "0" to a "1" and the add function is completed.

Since AND Gate 1861 is disabled upon the occurrence of a "0" in the eighth stage 1870, AND Gate 1867 will be enabled upon the occurrence of a phase 0 pulse on Conductor 1871 and the Add 1 Flip-Flop will be reset to terminate the incrementing function.

It has been assumed in the above discussion that a code other than 255 is to be incremented. In the process of incrementing the code 255, which in binary form, is all "1's," the next code in logical succession would be all "0's" representing line number 00. Line number 00 is reserved to indicate the absence of a line number in the system; therefore, this number need never be scanned. To omit the code wherein each element is in the "0" state, the All 1's Flip-Flop 1858 is employed.

At frame 3, word 22, bit 8, phase 0, AND Gate 1880 is enabled to set the All 1's Flip-Flop 1858 and during the twenty-third word period of the third frame, the "0" output of the serial shift register on Conductor 1882 appears as a final enabling signal to AND Gate 1881. If any element of the Scan Gate Number Code is in the "0" state, the All 1's Flip-Flop will be reset during the twenty-third time slot and incrementing of the serial Scan Gate Number will proceed as described above; however, if each element of the Scan Gate Number is in the "1" state, the All 1's Flip-Flop will remain in the set condition for the term of the twenty-third word and the setting of the Add 1 Flip-Flop 1860 will be delayed for one bit period. In all cases, other than when the circulating number is 255, the Add 1 Flip-Flop 1860 will be energized at frame 3, word 23, bit 8, phase 0, and where the number to be incremented is 255 and each of the code elements is "1," the setting of the Add 1 Flip-Flop 1860 will be delayed for one bit period until time frame 3, word 24, bit 1, phase 0. It is at this later time that AND Gate 1883 is enabled to set Add 1 Flip-Flop 1860. Thereby, the first or least significant bit of the Scan Gate Number is permitted to recirculate and the succeeding or more significant bits are all changed from "1" to "0." The number 255 is thus changed to the number 1 rather than the number zero.

A subscriber's line is scanned by addressing and thereby enabling the line gate such as 209 or 210 of FIG. 2. Each time a subscriber's line gate such as 209 or 210 is enabled to permit communication through the gate, an output signal is generated if the subscriber's station is in the off-hook condition and no output signal is generated if the subscriber's line is in the on-hook state. During the course of communication, a subscriber's line gate such as 209 or 210 and a send input gate such as 214 or 215 are simultaneously enabled to sample a subscriber's line such as 205 or 206 to obtain information for transmission to a distant station or operator. The Send Gate 214 or 215 is disabled after a sample has been obtained and shortly thereafter the Receive Output Gate 237 is enabled to transfer the detected signal from the distant station or operator via the Receiving Bus 213 and the Subscriber's Line Gate 209 or 210 to the subscriber's station 205 or 206.

In FIG. 2, there are shown two send legs, the first comprising the Input Gate 214, the Capacitor 251, the Clamp Gate 218, the Amplifier 216, and the Output Send Gate 222 and the second send leg comprises the Input Send Gate 215, the Capacitor 252, the Clamp Gate 219, the Output Amplifier 217, and the Output Send Gate 223. The two send legs are employed to permit the interleaving of encoding and sampling actions in the concentrator. The pulse amplitude modulation sample obtained from a subscriber's station such as 205 or 206 and temporarily stored on the Capacitor 251 or 252 is processed in the Encoder 225 to provide a 7 bit PCM signal to be transmitted via the Transmitting Amplifier 227 and the line 212 to the central office module for conveyance to another subscriber's station or to an operator. As noted earlier, each time slot comprises eight bit times. The last bit time of each time slot period is reserved for the return of one bit messages from the concentrator to the central office. In this invention, the eighth bit time is reserved for the return of scanner responses. The actions within the concentrator are timed so that the scanner response is available at bit 8 time of the time slot preceding the one in which a call is served for purposes of communication or for scanning to detect requests for service. For example, if a line is served for purposes of communication during the tenth time slot, the state of the supervisory line is determined at bit 8 time of the ninth time slot and an indication of the supervisory state is transmitted to the central office concentrator controller at that time.

Having considered the telephone switching system of the copending James et al. application and having set forth the subject invention in general terms, the following discussion relating to the details of this invention will be readily understood.

*Scanning to Detect Requests for Service*

As previously noted at the end of the last word of the third frame of each scanning cycle, the number circulating in the Shift Register 1851 is incremented by a count of one or by a count of two to obtain the Scan Gate Number of the next line to be scanned. During the fourth frame of the scanning cycle, the number which is circulating in the Shift Register 1851 is compared with the Line Gate Number in the Circulating Memory 301, 302 by means of the matching circuit of FIG. 4, to determine whether or not the line which is scheduled to be scanned is currently served in any of the time slots. The binary address of the line which is scheduled to be scanned in the following scanning cycle appears serially on a two rail basis on Conductors 1835 and 1836, which are the 1 and 0 output conductors of the seventh stage of the Shift Register 1851. The Line Gate Numbers which are in the memory for each time slot are obtained on a two rail basis over conductors 1059 and 1060 which are included in conductor group 342 of FIG. 3. Conductors 1059 and 1060 are the 0 and 1 output conductors of the second stage of the Line Gate Number Shift Register 302. As seen in FIG. 4, the "0" conductor of the Scan Gate Number Shift Register and the "1" conductor of the Line Gate Number Shift Register are the two inputs to the AND Gate 811 and the 1 output conductor of the Scan Gate Number Shift Register and the 0 conductor of the Line Gate Number Shift Register provide the input signals to the AND Gate 810. If any code element of the Scan Gate Number and the Line Gate Number differ, an output signal will be provided from AND Gate 810 or 811 and consequently an output signal will occur at the output of OR Gate 809. As the Scan Gate Number and the Line Gate Number are compared by means of AND Gates 810 and 811 and OR Gate 809, the mismatch Flip-Flop 807 will be enabled whenever there is a disagreement between the compared numbers. The Flip-Flop 807 is reset at bit 7, phase 2 of each word; therefore, there is an opportunity for the Flip-Flop 807 to be set each word time. The Match Flip-Flop 805 is reset only once per scanning cycle at frame 3, word 24, and there is an attempt made to set this flip-flop at bit 7 time of each word. Setting of the Match Flip-Flop 805 indicates that the number in the Scan Gate Number Memory has been found to be present in the Line Gate Number Circulating Memory 301, 302, and therefore this number is currently served for purposes of communication and will be scanned in the assigned time slot. If the number to be scanned is not encountered in the Line Gate Number Memory, the Mismatch Flip-Flop 807 will be set during each of the twenty-four word times of the fourth frame and therefore the Match Flip-Flop 805 will not be set during frame 4.

Once it has been determined that the number to be scanned is not currently served, the circuitry of FIG. 4 is conditioned to transmit the Scan Gate Number to the remote concentrator in the first idle time slot of frame 1. At frame 4, word 24, bit 8, the Scan Flip-Flop 481 is set if the number to be scanned is not in the memory as indicated by the energization of the Not in Memory Conductor 825.

An idle time slot is indicated when the first three bits of a call progress word are found to be in the "1" state. The call progress words are examined by means of the Detect Idle Time Slot Circuit 487 during the final portion of the preceding time slot. If an idle time slot is detected, the Idle Time Slot Conductor 483 will be energized at bit 8, phase 0 time of the time slot preceding the idle time slot. If the Scan Flip-Flop 481 is set to its "1" state and the Idle Time Slot Conductor 483 is energized during frame 1 of a scanning cycle, AND Gate 482 will be enabled and the Transmit Scan Flip-Flop 484 will be set to its "1" state. Setting of the Transmit Scan Flip-Flop 484 (1) resets the Scan Flip-Flop 481; (2) enables the AND Gate 802 and inhibits the AND Gate 803; (3) enables AND Gates 822 and 836 to transmit the Scan Gate Number from Conductors 831 and 832 to the Line Gate Number Memory via Conductor Group 357 of FIG. 3, and (4) advises the Call Progress Word Translator 319 by means of a signal on Conductor 486 that the line whose number is being inserted in the Line Gate Number Memory 301—302 is to be scanned and that the call progress word translator should insert in the chosen time slot the call progress word which indicates that the line is being scanned to detect a request for service.

The Scan Gate Number which is transmitted to the remote concentrator via the Control Conductor 203 of FIG. 2 is employed in the remote concentrator to enable a subscriber's line gate such as 209 or 210. The Line Circuit 207 and the Line Scanner 204 of FIG. 2 are shown in greater detail in FIG. 6. The Serial Binary Scan Gate Number is processed in the Remote Concentrator Controller 200 to make the necessary serial to parallel conversion. The Line Gate 209 is enabled for slightly more than one-half of the time slot period. If the Subscriber's Station 205 is in the off-hook condition at the time the Line Transmission Gate 209 is enabled, the AND Gate 435, which is discrete to Subscriber's Line Circuit 207 will be enabled and the Scan Flip-Flop 556 will be set to its "1" state. The Scan Flip-Flop 556 is reset at N52 which is phase 2 time of bit 5 of every time slot.

In that the concentrator is physically remote from the central office, the operations within the concentrator are controlled by an order of time which is relative to the order of time established within the central office. That is, there is an inherent transmission delay in the Transmission Paths 117 and 118 which run from the Concentrator Controller 108 to the Concentrator 105 and similarly there is an inherent transmission delay in the Send Transmission Path 116 which runs from the Concentrator 105 to the Concentrator Controller 108. In accordance with the system of the copending James et al. application, the loop transmission delay from the central office to the concentrator and back to the central office is adjusted to be an integral number of frames. In this system, communication information from a remote concentrator is gated through the Junctor Switching Network 119 in the time slots or word periods which are established in the repetitive office cycle at the central office. There are elements of transmission delay between the input circuitry of the central office concentrator controller and the concentrator-to-junctor crosspoints; therefore, codes transmitted from the remote concentrator to the central office begin and end in the middle of the time slots established in the order of time at the remote concentrator.

For convenience of explanation, the manner of labeling of timing conductors in the concentrator differs slightly from that employed in the central office. At the remote concentrator, the basic bit and phase signals are combined to provide complex timing signals. As previously noted, at the central office the frame, word, bit, and phase conductors are used in combination to time work functions within the central office. At the remote concentrator, however, the complex timing signals indicating bit and phase are employed. Timing signals within the remote concentrator are labeled $N_{B\varphi}$ wherein N represents the word of the repetitive cycle, B represents the bit of the word, and $\varphi$ represents the phase. An indication of frame number is not required at the remote concentrator.

Figure 6:
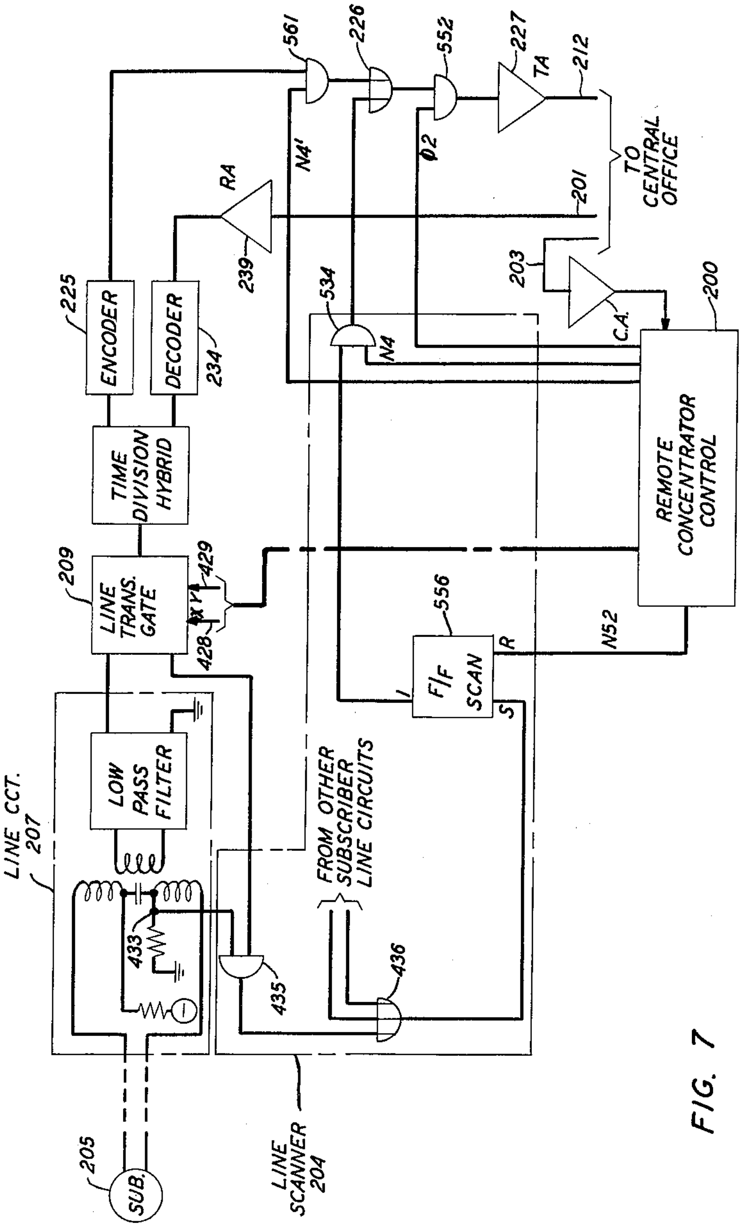
FIG. 6 is a block diagram of the scanning arrangements at the remote concentrator.
Figure 7:
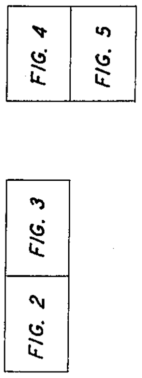
FIG. 7 is the key figure which shows the arrangement of FIGS. 2 and 3 and FIGS. 4 and 5.

The Line Transmission Gate 209 is enabled at time N10 in response to the Binary Scan Gate Number which was transmitted from the central office. If the Subscriber's Station 205 is in the off-hook condition when the Line Transmission Gate 209 is enabled, the Scanning Gate 435 which is discrete to the Subscriber's Line 205 will be enabled and the Scan Flip-Flop 556 will be set to its "1" state. The order of timing on the conductor 212 is such that the last bit of every time slot occurs at N4 time, i.e., bit 4 time of the concentrator cycle. The scan response is transmitted from the remote concentrator to the central office at time N42 and during the N4 time transmission of output signals from the Encoder 225 are inhibited. As seen in FIG. 6, the 1 output conductor of the Scan Flip-Flop 556 and the N4 timing conductor comprise the input signals to the AND Gate 534. Accordingly, if at time N4, the Scan Flip-Flop 556 is in its "1" state, the AND Gate 534 will be enabled and a scan response indicating that the scanned line is in the off-hook state will be transmitted through OR Gate 226, AND Gate 552, Transmitting Amplifier 227, and transmitting line 212 to the central office. If the scanned line, however, is found to be in the on-hook state, the Scan Flip-Flop 556 will be in its "0" state at time N42 and no response will be transmitted. In any event, the AND Gate 561 which connects the output of the Encoder 225 to the Transmitting Amplifier 227 is enabled for all times other than N4. That is, the N4' conductor is enabled for all times other than bit 4 time of every word. The Scan Flip-Flop 556 is reset at time N52 which is one bit period after the scan response has been transmitted to the central office. The Scan Flip-Flop 556 is therefore prepared to accept a new scanner output signal during each time slot of the repetitive cycle. As will be seen with respect to the scanning of lines to detect answers, hangups, and dial pulses, the operation of the line scanning elements at the remote concentrator are independent of the function for which scanning is performed. That is, the mode of operation during scanning in a remote concentrator is the same during the scanning of lines to detect requests for service and the scanning of lines to detect answers, hangups, dial pulses, et cetera.

The scan reply is transmitted through the Variable Delay 309 of FIG. 3 and Conductor 341 to the Line Scanning Control 315. Portions of the Line Scanning Control are shown in detail in FIG. 4. The scan reply reaches AND Gate 488 and is gated therethrough at bit 8, phase 0 time. If the scan reply indicates that the scanned line was in the off-hook state, the Scan Response Flip-Flop 813 will be set to its "1" state; however, if the scan reply indicates that the scanned line was in the on-hook state, the Scan Response Flip-Flop 813 will not be set to its "1" state. The state of the Scan Response Flip-Flop 813 is transmitted via Conductor 495 of conductor group 347 to the Call Progress Word Translator 319 for the purposes of updating the call progress word circulating in the Call Progress Word Memory 305, 306. If during an initial scan for service, the scanned line is found to be in the off-hook state, the call progress word is advanced to indicate that a suspected request for service is indicated. If, however, the scanned line is found to be in the on-hook state, the call progress word is changed to indicate that the time slot is idle and the Line Gate Number is erased from the Circulating Line Gate Number Memory 301, 302.

After a suspected request for service has been indicated, the line is scanned during the assigned time slot in each successive frame to verify the request for service. A line is thus scanned 8,000 times per second and the call progress word is advanced through a number of states at selected frame intervals before a decision is reached that a valid request for service has been detected as opposed to a false noise signal indication of a continuing off-hook condition.

In accordance with the above outlined procedure, the lines served by a concentrator are sequentially scanned to detect a request for service. However, if a line is currently served for purposes of communication when its number appears in the Scan Gate Number Memory, the scanning of that line to detect a request for service will be omitted as that line will be scanned as described below in the operating time slot. In the event that a line which is scheduled to be scanned is found to be currently served, the scanning of lines to detect requests for service is temporarily halted.

*Scanning to Detect Dial Pulses*

Once a valid request for service has been detected, the office control module, by means of the Central Control 113, must establish a connection between the subscriber such as 106 and 107 and a register circuit in the Central Control 113. Such a connection established through a concentrator such as 105, a concentrator controller such as 108, Junctor Switching Network 119, Trunkor Controller 111, Trunkor 110, and conductor group 150 to a register circuit within the Central Control 113. Such a connection is established in a time slot which is idle in both the concentrator and trunkor. Whenever possible, the time slot in which the request for service was detected is employed in the detection of dial pulses.

Also, after a valid request for service has been detected, the call progress word in the Circulating Memory 305, 306 for the time slot in which the request occurred is changed to indicate that call signaling information, i.e., dial pulses are forthcoming. The Call Progress Word Translator 319 is arranged to provide a signal to the line scanning control on Conductor 348 whenever the call progress word indicates that dial pulses are anticipated. The Dial Flip-Flop 489 is set to its "1" state when the Dial Conductor 348 is energized. The Call Progress Word Translator 319 is arranged to enable the Dial Conductor 348 at bit 8, phase 0 of the time slot preceding the one in which dial pulses are anticipated. The Dial Flip-Flop 489 is arranged to be reset by an output signal from the AND Gate 1155 at the succeeding bit 7, phase 2 time; therefore, the Dial Flip-Flop 489 will remain set for one full word period. When the Dial Flip-Flop 489 is in its "1" state, the AND Gate 490 is inhibited and the AND Gate 491 is enabled. If the scan reply on Conductor 341 indicates that the scanned line is in the off-hook state, the Scan Response Flip-Flop 813 will be set to its "1" state and the AND Gate 491 will be enabled as was the Dial Flip-Flop 489 for one full word period.

The one bit scan reply on Conductor 341 is thereby stretched to provide a signal to the dial pulse register on a conductor of conductor group 150 for a full eight bit period. Dial pulse signals are accordingly advantageously transmitted from a subscriber's station through both concentrator and central office time division switching networks to a dial pulse register in the Central Control 113. During the on-hook periods of the dial pulse signaling sequence, the Scan Response Flip-Flop 813 will remain in its "0" state and AND Gate 491 will not be enabled; however, during the period in which a dial pulse is anticipated, the AND Gate 490 will be inhibited to isolate the Conductor 390 from Conductor 391, thereby avoiding the introduction of noise signals into the dial pulse register. As previously indicated, the scanning of lines at the remote concentrator is independent of the purpose to which the scan reply will be put. Advantageously, the call progress words which are read from the Circulating Memory 305, 306 indicate what steps are to be taken in response to the scan reply. During the course of dialing, the Dial Flip-Flop 489 is set and single bit scan replies are stretched to provide conventional dial pulses to a register in the Central Control 113. As will be seen from the following discussion, during the course of communication the system must also be capable of detecting when a called party has answered, when a calling party has abandoned a call, and when talking parties have hung up.

*Scanning to Detect Answers and Hangups*

As previously noted, the call progress words in the Circulating Memory 305, 306 indicate the current state of the call. After dial pulses have been detected, Central Control 113 takes the necessary steps to establish a connection between a calling and a called subscriber. Such a connection is established in accordance with the principles set forth in the previously-noted copending application of James et al. The call progress word associated with a called party indicates that the called line is being rung and an answer is awaited and that ringing induction is being returned to the calling party. The call progress word associated with a calling line indicates that the line is in a talking condition and as the call proceeds, changes in the supervisory state of the calling subscriber station will be noted and acted upon.

In the event that the called party answers, the scan reply on Conductor 341 will enable AND Gate 488 at bit 8, phase 0 time, and the Scan Response Flip-Flop 813 will be set to its "1" state. In that the Dial Flip-Flop 489 is in its "0" state at this time, the AND Gate 491 will not be enabled. The 1 output conductor of the Scan Response Flip-Flop 813 is connected to the call progress word translator 319 by way of Conductor 495 which is part of conductor group 347. When the call progress word in the Circulating Memory 305, 306 indicates that a subscriber station is being rung and the scan reply indicates that the called subscribed is in the off-hook supervisory state, the ringing tone will be removed from the called subscriber's line; the ringing induction will be removed from the calling subscriber's line; a transmission path will be established through the concentrator controllers between the calling and called subscribers and the call progress word associated with the called subscriber will be updated to indicate that the subscriber's line is in the talking condition.

For the duration of a call, both the calling and called subscribers' lines are scanned in the time slot in which the call is served to detect hangups by either subscriber. After a transmission path has been established between a calling and called subscriber, the call progress words associated with both subscribers indicate that the stations are in a calling state. The calling subscriber is further identified only for the purpose of automatic customer billing. Each time the subscriber's line gate is enabled for the purposes of communication, the supervisory state of the line is noted and returned to the central office concentrator controller. If the scan reply indicates that the line is in the off-hook state, the Scan Response Flip-Flop 813 is set to its "1" state and this indication is transmitted over the 1 Output Conductor 495 of the Scan Response Flip-Flop 813 to the Call Progress Word Translator 319. In the Call Progress word Translator 319, an indication that a subscriber's line is in the talking condition and in the off-hook state is ignored as no further action is required at that time; however, an indication that a subscriber's line is in the talking condition and in an on-hook supervisory state is noted and the call progress word is changed to indicate a suspected hangup. In subsequent selected frames, the suspected hangup is verified and the call progress word is changed to indicate an idle time slot and the subscriber's Line Gate Number and the Junctor Gate Number are erased from the Circulating Memories 301, 302, 303, and 304. The manner in which a call is traced to assure release of facilities in both the calling and called concentrator is not set forth at this time as this function is unimportant to an understanding of the subject invention.

In summary, advantageously, in accordance with this invention, two scanning routines are employed in a concentrator controller of a time division multiplex pulse code modulation telephone switching system. The first scanning routine is employed to scan lines to detect requests for service and the second routine is employed to scan lines to verify requests for service, to detect dial pulses, answers, hangups, and abandonment of calls.

The operation of the scanning arrangements at the remote concentrator is independent of the purpose to which scanning information is to be employed. That is, a single scanning routine is employed in the concentrator without regard to the purpose for which the line is scanned.

It is to be understood that the above-described arrangements are but illustrative of the application of the principles of the invention. Numerous other arrangements may be devised by those skilled in the art without departing from the spirit and scope of the invention.

What is claimed is:

1. In a communication system, a plurality of subscriber lines, a concentrator connected to and serving said subscriber lines, a central office control module, a central office concentrator controller for controlling said concentrator, transmission and control means interconnecting said concentrator and said concentrator controller, means in said central office control module defining a repetitive office cycle comprising a scanning cycle having a plurality of frames, each of said frames having a plurality of time slots and each of said time slots having a plurality of bit times, means for selectively establishing a connection through said concentrator from a particular one of said lines to said concentrator controller in a particular time slot of said repetitive cycle, a scan gate number generator in said central office control module for generating sequentially the address codes representative of said lines connected to and served by said concentrator, first memory means in said concentrator controller for maintaining a record of the subscriber lines connected through said concentrator, matching means in said concentrator controller for determining if the subscriber line represented by the address code currently in said scan gate number generator is connected through said concentrator, transmitting means in said concentrator controller responsive to said matching means for transmitting to said concentrator the address code in said scan gate number generator, and means in said concentrator responsive to said address code to scan the line represented by said transmitted address code to detect a request for service.

2. A communication system in accordance with claim 1 in which said central office concentrator controller further comprises means for determining the first idle time slot in the repetitive office cycle, and means for enabling said transmitting means in said first idle time slot.

3. A communication system in accordance with claim 2 further comprising means in said concentrator for transmitting to said central office a scan reply indicating the supervisory state of the scanned line, a second memory means in said concentrator controller wherein signal codes representative of the current state of calls served by said concentrator are maintained, register means in said concentrator controller responsive to said scan reply, and translation means in said concentrator controller responsive to said register means and to said codes read from said second memory means to modify said codes in said second memory means.

4. A communication system in accordance with claim 3 wherein said first and said second memory means are circulating memory means.

5. A communication system in accordance with claim 3 wherein said central office concentrator controller further comprises means for inserting in said first memory means the address code in said scan gate number generator.

6. A communication system in accordance with claim 5 wherein said concentrator controller further comprises means for inserting in said second memory means a first code indicating that said line represented by said address which was inserted in said first memory means is being scanned to detect a request for service, said translation means responsive to said first code and to an on-hook scan reply to erase from said first memory means the address of said scanned line.

7. In a communication system, a central office control module, a plurality of subscriber lines, a concentrator connected to and serving said subscriber lines, a central office concentrator controller for controlling said concentrator, transmission and control means interconnecting said concentrator and said concentrator controller, means in said central office control module defining a repetitive office cycle comprising a scanning cycle having a plurality of frames, each of said frames having a plurality of time slots and each of said time slots having a plurality of bit times, means for establishing a connection through said concentrator from a particular one of said lines to said concentrator controller in a particular time slot of said repetitive cycle, means in said concentrator for determining the supervisory state of said particular line during the time it is served by a connection through said concentrator, means in said concentrator for transmitting a scan reply indication of the supervisory state of said line to said concentrator controller, and register means in said concentrator controller responsive to said scan reply.

8. In a communication system, a plurality of subscriber lines, a concentrator connected to and serving said subscriber lines, a central office control module, a concentrator controller for controlling said concentrator, transmission and control means interconnecting said concentrator and said concentrator controller, a trunkor, a trunkor controller for controlling said trunkor, transmission and control means interconnecting said trunkor and said trunkor controller, a time and space division switching network interconnecting said concentrator controller and said trunkor controller, means in said central office control module defining a repetitive office cycle comprising a scanning cycle having a plurality of frames, each of said frames having a plurality of time slots and each of said time slots having a plurality of bit times, dial pulse register means in said central office, transmission means interconnecting said trunkor and said dial pulse register means, means for establishing a connection through said concentrator, through said time and space division switching network and through said trunkor in a particular time slot of said repetitive cycle between a particular one of said subscriber lines and said dial pulse register, means in said concentrator for determining the supervisory state of said particular line during the time said connection between said subscriber's line and said dial pulse register is established, means in said concentrator for transmitting a scan reply to said concentrator controller, means in said concentrator controller responsive to said scan reply to generate a dial pulse signal, and means for transmitting said dial pulse signal to said dial pulse register.

9. In a communication switching system, a plurality of subscriber lines, a concentrator connected to and serving said subscriber lines, a central office control module, a concentrator controller for controlling said concentrator, transmission and control means interconnecting said concentrator and said concentrator controller, a trunkor, a trunkor controller for controlling said trunkor, transmission and control means interconnecting said trunkor and said trunkor controller, a time and space division switching network interconnecting said concentrator controller and said trunkor controller, means in said central office control module defining a repetitive office cycle comprising a scanning cycle having a plurality of frames, each of the said frames having a plurality of time slots and each of said time slots having a plurality of bit times, dial pulse register means in said central office, transmission means interconnecting said trunkor and dial pulse register means, means for establishing a connection through said concentrator, through said time and space division switching network and through said trunkor, and through said trunkor in one of said time slots of said repetitive cycle between a particular one of said subscriber lines and said dial pulse register, a first memory means in said concentrator controller wherein address codes representative of the lines connected through said concentrator are maintained, a second memory means wherein signal codes representative of the current state of a call are maintained, one of said signal codes indicating that a subscriber's line is being scanned to detect dial pulse transitions, scanning means in said concentrator for determining the supervisory state of said one particular line, means in said concentrator for transmitting a scan reply to said central office indicating the supervisory state of said scanned line, first bistable means responsive to said one code read from said second memory means, second bistable means responsive to said scan reply, and gating means responsive to the states of said first and said second bistable means for generating a dial pulse signal, said dial pulse signal being of a greater duration than said scan reply.

10. In a communication system in accordance with claim 9, third memory means wherein address codes representative of the connections through said time and space division switching network are maintained.

11. A communication system in accordance with claim 10 wherein said first, second, and third memory means are circulating memory means.

12. A time division telephone system comprising a plurality of subscriber lines, a concentrator connected to said subscriber lines, central office control means, transmission means interconnecting said concentrator and said central office control means, means in said central office control means defining a repetitive office cycle comprising a plurality of time slots, means for selectively establishing connections through said concentrator from particular ones of said lines to said central office control means in particular time slots of said cycle, means for detecting requests for service from said lines in any idle one of said time slots, means for assigning said idle one of said time slots to a service requesting line, and means for subsequently detecting supervisory and dial signals in said assigned time slot.

13. A time division telephone system in accordance with claim 12 further comprising memory means in said central office control means for storing information as to the current status of each call being serviced in said time slots, translation means responsive to said current status information and said supervisory signals in the same time slot for updating said information in said memory means.

14. A time division telephone system comprising a plurality of subscriber lines, a concentrator connected to said subscriber lines, central office control means, transmission means interconnecting said concentrator and said central office control means, means in said central office control means defining a repetitive office cycle comprising a plurality of time slots, means for selectively establishing communication connections through said concentrator from said lines to said central office control means in any of said time slots, and means for scanning to detect requests for service from said lines in any one of said time slots not utilized for a communication connection through said concentrator.

15. A time division telephone system in accordance with claim 14 further comprising means for scanning said lines connected through said concentrator in the time slots in which said connections are established to detect answers, hangups, and dial pulses.

16. A time division telephone system comprising a plurality of subscriber lines, a concentrator connected to said lines, central office means including control means and a time and space division switching network, transmission means interconnecting said concentrator and said central office control means, means in said central office control means defining a repetitive office cycle comprising a plurality of time slots, means for selectively establishing connections through said concentrator from particular ones of said lines to said central office switching network in particular time slots of said cycle, means for scanning a different one of said lines in successive office cycles in any idle one of said time slots for detecting requests for service from said lines, means for assigning said idle one of said time slots to a service requesting line, means for detecting changes in the supervisory state of said lines during each office cycle in the time slots assigned to said lines, a dial signal register, and means responsive to certain of said changes in supervisory state for transmitting dial signals through said switching network to said register.

17. A time division telephone system comprising a plurality of communication paths, a time division switching network, control means for defining a repetitive office cycle comprising a plurality of time slots, means for selectively establishing connections from particular ones of said paths through said switching network in particular time slots of said cycle, means for detecting requests for service from said paths in any idle one of said time slots in an office cycle, means for assigning said idle one of said time slots to a service requesting path, and means for subsequently detecting supervisory signals from each service requesting path in its assigned time slot in each office cycle.

18. A time division telephone switching system comprising a plurality of subscriber lines, a concentrator connected to and serving said lines, a central office concentrator controller, means for defining a repetitive office cycle comprising a plurality of time slots, means for selectively establishing connections through said concentrator between said lines and said concentrator controller, means for performing a plurality of scanning routines in each office cycle, said means comprising means for scanning a different one of said lines for service requests in the first idle time slot of successive office cycles, and means for scanning lines connected through said concentrator in the assigned time slot for supervisory signals in each office cycle.

References Cited in the file of this patent

UNITED STATES PATENTS

| | | |
|---|---|---|
| 2,715,658 | Dunlap | Aug. 16, 1955 |
| 2,872,518 | Trousdale | Feb. 3, 1959 |
| 2,884,488 | Trousdale | Apr. 28, 1959 |
| 2,892,035 | Trousdale | June 23, 1959 |
| 2,910,540 | Van Mierlo | Oct. 27, 1959 |